(12) United States Patent
Sha et al.

(10) Patent No.: US 11,825,435 B2
(45) Date of Patent: Nov. 21, 2023

(54) SERVICE TRANSMISSION METHOD AND DEVICE

(71) Applicant: ZTE Corporation, Shenzhen (CN)

(72) Inventors: Xiubin Sha, Shenzhen (CN); Bo Dai, Shenzhen (CN); Ting Lu, Shenzhen (CN); Yin Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 279 days.

(21) Appl. No.: 17/279,673

(22) PCT Filed: Sep. 3, 2019

(86) PCT No.: PCT/CN2019/104103
§ 371 (c)(1),
(2) Date: Mar. 25, 2021

(87) PCT Pub. No.: WO2020/063269
PCT Pub. Date: Apr. 2, 2020

(65) Prior Publication Data
US 2021/0400612 A1 Dec. 23, 2021

(30) Foreign Application Priority Data
Sep. 27, 2018 (CN) .......................... 201811133953.X

(51) Int. Cl.
H04W 56/00 (2009.01)
H04J 3/06 (2006.01)
H04W 28/02 (2009.01)

(52) U.S. Cl.
CPC ....... *H04W 56/0045* (2013.01); *H04J 3/0658* (2013.01); *H04W 28/0268* (2013.01); *H04W 56/001* (2013.01); *H04W 56/009* (2013.01)

(58) Field of Classification Search
CPC ......... H04W 56/0045; H04W 28/0268; H04W 56/001; H04W 56/009; H04W 72/23;
(Continued)

(56) References Cited

U.S. PATENT DOCUMENTS 6,957,265 B2 * 10/2005 Porotsky ............... H04L 45/123
370/252
10,425,955 B2 * 9/2019 Pang ..................... H04W 76/12
(Continued)

FOREIGN PATENT DOCUMENTS

CN 1516374 A 7/2004
CN 101662356 A 3/2010
(Continued)

OTHER PUBLICATIONS

ZTE et al. "Resource Pool Sharing Between Mode 3 and Mode 4", 3GPP TSG RAN WG1 Meeting #92bis, R1-1803895, Apr. 20, 2018.
(Continued)

*Primary Examiner* — Afshawn M Towfighi
(74) *Attorney, Agent, or Firm* — CANTOR COLBURN LLP

(57) ABSTRACT

Provided are a service transmission method and device. The method includes: a base station acquires a service transmission pattern provided by a sender, the service transmission pattern at least including one of the following information: starting time of a service transmission, ending time of the service transmission, a service transmission period or interval, a service transmission time length in each transmission period, a data packet size or GBR in each transmission period and a service transmission delay requirement; the base station pre-configures a transport resource according to the service transmission pattern; the base station acquires user data provided by the sender, the user data containing a taking-effective time point of a service at a destination end;
(Continued)

and the base station transmits the user data to the destination end through the transport resource before the taking-effective time point.

20 Claims, 10 Drawing Sheets

(58) Field of Classification Search
CPC ... H04W 4/06; H04W 72/04; H04W 72/1273; H04W 72/543; H04J 3/0658
See application file for complete search history.

(56) References Cited

U.S. PATENT DOCUMENTS

| | | | |
|---|---|---|---|
| 2003/0011826 A1* | 1/2003 | Takaoka | H04N 1/32765 358/440 |
| 2003/0021231 A1* | 1/2003 | Evans | H04L 9/40 370/230 |
| 2003/0048811 A1* | 3/2003 | Robie, Jr. | H04J 3/0667 370/516 |
| 2009/0172122 A1 | 7/2009 | Toume et al. | |
| 2009/0253434 A1* | 10/2009 | Hayashi | H04W 92/20 455/436 |
| 2011/0007638 A1* | 1/2011 | Xu | H04L 65/765 370/252 |
| 2012/0140689 A1* | 6/2012 | Pelletier | H04L 5/0005 370/311 |
| 2014/0222962 A1* | 8/2014 | Mao | H04L 65/403 709/219 |
| 2016/0191610 A1* | 6/2016 | Li | H04W 4/027 709/217 |
| 2021/0400612 A1* | 12/2021 | Sha | H04W 56/001 |

FOREIGN PATENT DOCUMENTS

| | | |
|---|---|---|
| CN | 101925156 A | 12/2010 |
| CN | 101931875 A | 12/2010 |
| CN | 102264030 A | 11/2011 |
| CN | 103476102 A | 12/2013 |
| CN | 106339255 A | 1/2017 |
| CN | 106815066 A | 6/2017 |
| CN | 107295679 A | 10/2017 |
| CN | 107396396 A | 11/2017 |
| EP | 3229544 A1 | 10/2017 |
| WO | 2011147268 A1 | 12/2011 |
| WO | 2017157181 A1 | 9/2017 |

OTHER PUBLICATIONS

International Search Report for corresponding application PCT/CN2019/104103 filed Sep. 3, 2019; dated Nov. 27, 2019.
3GPP TSG-RAN WG2#56bis, Sorrento, Italy, Jan. 15-19, 2007, Scheduler triggered handover, Siemens Networks, R2-070255.
European Search Report EP865791; Report dated Oct. 25, 2021.
Li Xu, Performance Modeling and Protocol Parameters Optimization for Centralized Multi-Hop Scheduling Systems, Journal of Beijing University of Posts and Telecommunications, Apr. 2016, vol. 39 No. 2.

* cited by examiner

SERVICE TRANSMISSION METHOD AND DEVICE

CROSS-REFERENCE TO RELATED APPLICATIONS

The present disclosure claims priority to Chinese Patent Application No. 201811133953.X, filed to the China Patent Office on Sep. 27, 2018, the disclosure of which is hereby incorporated by reference in its entirety.

TECHNICAL FIELD

The disclosure relates to the field of communication, and particularly to a service transmission method and device.

BACKGROUND

In an Industrial Internet of Things (IIoT) system, machine instructions are usually transmitted in an IIoT service, and the delay sensitivity of the service is quite high and usually reaches a microsecond level. In a present wireless communication system, service transmission involves transmission between multiple nodes. For example, service transmission between terminals usually involves transmission from a terminal to a base station, transmission from the base station to a core network, transmission from the core network to a target base station and transmission from the target base station to a target terminal. Service transmission from an Application Server (AS) to a terminal usually involves transmission from the AS to a core network, transmission from the core network to a base station and transmission from the base station to the terminal. Therefore, for the IIoT, it is difficult to ensure a delay requirement of a service, and it is necessary to control a service transmission delay between each node strictly. Meanwhile, it is necessary to pre-judge a taking-effective time point of a service (for example, a machine instruction) at a destination end, and a sender ensures that the service reaches the destination end before taking-effective at the destination end.

SUMMARY

Embodiments of the disclosure provide a service transmission method and device, to at least solve the problem of how to ensure a delay requirement of a service in a related art.

According to an embodiment of the disclosure, a service transmission method is provided, which may include that: a base station acquires a service transmission pattern provided by a sender, the service transmission pattern at least including one of the following information: starting time of a service transmission, ending time of the service transmission, a service transmission period or interval, a service transmission time length in each transmission period, a data packet size or Guaranteed Bit Rate (GBR) in each transmission period and a service transmission delay requirement; the base station pre-configures a transport resource according to the service transmission pattern; the base station acquires user data provided by the sender, the user data containing a taking-effective time point of a service at a destination end; and the base station transmits the user data to the destination end through the transport resource before the taking-effective time point.

Herein, the transport resource may at least include one of a resource starting position, a resource period or interval and a resource active time length in each resource period.

Herein, there may be multiple service transmission patterns, the multiple service transmission patterns may coexist in the service transmission, or the multiple service transmission patterns may exist in the service transmission according to a temporal sequence.

Herein, the operation that the base station pre-configures the transport resource according to the transmission pattern may include that: the base station pre-configures a periodic transport resource for each service transmission pattern, or the base station configures different activation time for each service transmission pattern in a periodic transport resource.

Herein, the transport resource may be configured through Radio Resource Control (RRC) signaling and/or configured through Downlink Control Information (DCI).

Herein, the method may further include that: a state of the destination end and/or a user data transmission delay are/is fed back to the sender for the sender to determine a time advance for next user data sending.

Herein, the sender may be an AS, and the destination end may be User Equipment (UE).

Herein, the operation that the base station acquires the service transmission pattern provided by the sender may include that: an Access and Mobility Management Function (AMF)/User Plane Function (UPF) receives the user data and/or service transmission pattern sent by the AS; and/or the AMF/UPF sends a paging message to the base station, the base station sends a paging message to the UE, and RRC connections are established or resumed between the UE, the base station and the AMF/UPF; and the base station receives the service transmission pattern from the AMF/UPF.

Herein, the sender may be first UE, and the destination end may be the AS or second UE.

Herein, a type of the service may be an IIoT service.

According to an embodiment of the disclosure, another service transmission method is also provided, which may include that: a base station acquires a service transmission delay requirement and user data provided by a sender, the user data containing an instruction sequence of a service and a taking-effective time point of the instruction sequence at a destination end; and the base station transmits the user data to the destination end based on the service transmission delay requirement before the taking-effective time point of the instruction.

Herein, the user data may contain multiple instruction sequences, and each instruction sequence may have corresponding a taking-effective time point.

Herein, the instruction sequence may include at least one of the following information: starting time of the instruction sequence, ending time of an instruction, a content of the instruction sequence and an interval of the instruction sequence.

Herein, the method may further include that: a state of the destination end and/or a user data transmission delay are/is fed back to the sender for the sender to determine a time advance for next user data sending.

Herein, the sender may be an AS, and the destination end may be UE; or, the sender may be first UE, and the destination end may be the AS or second UE.

According to an embodiment of the disclosure, another service transmission method is also provided, which may include that: a base station acquires user data provided by a sender, the user data containing a taking-effective time point of a server at a destination end; and the base station transmits the user data to the destination end before the taking-effective time point.

Herein, the sender may be an AS, and the destination end may be UE.

Herein, the operation that the base station acquires the user data provided by the sender may include that: an AMF/UPF receives the user data sent by the AS; the base station receives a user data transmission delay requirement sent by the AMF/UPF and sends a response message of the user data transmission delay requirement to the AMF/UPF; the AMF/UPF feeds back a user data transmission delay to the AS for the AS to determine a timing advance for next user data sending; and the base station receives the user data sent by the AMF/UPF.

Herein, the sender may be first UE, and the destination end may be the AS or second UE.

According to an embodiment of the disclosure, a clock synchronization method is also provided, which may include that: a first node receives an indication message indicating that a second node has a clock source from the second node; the first node sends a clock synchronization request to the second node, the clock synchronization request containing sending time T1 of the synchronization request; the first node receives a clock synchronization response from the second node, the clock synchronization response containing the sending time T1 of the synchronization request, receiving time T2 of the clock synchronization request at the second node and sending time T3 of the clock synchronization response; and the first node calculates a clock difference $T_{diff}$ of the first node and the second node according to the sending time T1 of the synchronization request, the receiving time T2 of the clock synchronization request, the sending time T3 of the clock synchronization response and receiving time T4 of the clock synchronization response and determines a clock of the second node according to the clock difference.

Herein, before the operation that the first node receives the indication message indicating existence of the clock source from the second node, the method may further include that: the first node sets default clock information of the first node, and the second node sets clock information of the second node according to the clock source.

Herein, the first node may be a base station without any clock source or a clock control node, and the second node may be a base station with a clock source.

According to an embodiment of the disclosure, another clock synchronization method is also provided, which may include that: a first node receives an indication message indicating that a second node has no clock source from the second node; the first node sends a clock synchronization request to the second node, the clock synchronization request containing sending time T1 of the synchronization request; the first node receives a clock synchronization response from the second node, the clock synchronization response containing the sending time T1 of the synchronization request, receiving time T2 of the clock synchronization request at the second node and sending time T3 of the clock synchronization response; the first node calculates a clock transmission delay between the first node and the second node and/or a clock difference of the first node and the second node according to the sending time T1 of the synchronization request, the receiving time T2 of the clock synchronization request, the sending time T3 of the clock synchronization response and receiving time T4 of the clock synchronization response; and the first node sends present clock information of the first node and the transmission delay between the first node and the second node or the clock difference of the first node and the second node to the second node.

Herein, the method may further include that: the second node corrects a clock of the second node according to the present clock information of the first node and the transmission delay between the first node and the second node or the clock difference of the first node and the second node.

Herein, the first node may be a clock control node, and the second node may be a base station without any clock source.

According to an embodiment of the disclosure, a service transmission device is also provided, which may include: a first acquisition module, configured to acquire a service transmission pattern provided by a sender, the service transmission pattern at least including one of the following information: starting time of a service transmission, ending time of the service transmission, a service transmission period or interval, a service transmission time length in each transmission period, a data packet size or GBR in each transmission period and a service transmission delay requirement; a configuration module, configured to pre-configure a transport resource according to the service transmission pattern; a second acquisition module, configured to acquire user data provided by the sender, the user data containing a taking-effective time point of a service at a destination end; and a transmission module, configured to transmit the user data to the destination end through the transport resource before the taking-effective time point.

Herein, the transport resource may at least include one of a resource starting position, a resource period or interval and a resource active time length in each resource period.

Herein, there may be multiple service transmission patterns, the multiple service transmission patterns may coexist in the service transmission, or the multiple service transmission patterns may exist in the service transmission according to a temporal sequence.

Herein, the configuration module may further be configured to pre-configure a periodic transport resource for each service transmission pattern or configure different activation time for each service transmission pattern in a periodic transport resource.

Herein, the device may further include: a feedback module, configured to feed back a state of the destination end and/or a user data transmission delay to the sender for the sender to determine a time advance for next user data sending.

Herein, the sender may be an AS, and the destination end may be UE; or, the sender may be the UE, and the destination end may be the AS.

According to an embodiment of the disclosure, another service transmission device is also provided, which may include: an acquisition module, configured to acquire a service transmission delay requirement and user data provided by a sender, the user data containing an instruction sequence of a service and a taking-effective time point of the instruction sequence at a destination end; and a transmission module, configured to transmit the user data to the destination end based on the service transmission delay requirement before the taking-effective time point of the instruction.

Herein, the user data may contain multiple instruction sequences, and each instruction sequence may have corresponding a taking-effective time point.

Herein, the device may further include: a feedback module, configured to feed back a state of the destination end and/or a user data transmission delay to the sender for the sender to determine a time advance for next user data sending.

Herein, the sender may be an AS, and the destination end may be UE; or, the sender may be the UE, and the destination end may be the AS.

According to an embodiment of the disclosure, another service transmission device is also provided, which may include: an acquisition module, configured to acquire user data provided by a sender, the user data containing a taking-effective time point of a server at a destination end; and a transmission module, configured to transmit the user data to the destination end before the taking-effective time point.

Herein, the device may further include: a feedback module, configured to feed back a state of the destination end and/or a user data transmission delay to the sender for the sender to determine a time advance for next user data sending.

Herein, the sender may be an AS, and the destination end may be UE; or, the sender may be the UE, and the destination end may be the AS.

According to an embodiment of the disclosure, a clock synchronization device is also provided, which may be located at a first node and include: a first receiving module, configured to receive an indication message indicating that a second node has a clock source from the second node; a sending module, configured to send a clock synchronization request to the second node, the clock synchronization request containing sending time T1 of the synchronization request; a second receiving module, configured to receive a clock synchronization response from the second node, the clock synchronization response containing the sending time T1 of the synchronization request, receiving time T2 of the clock synchronization request at the second node and sending time T3 of the clock synchronization response; and a calculation module, configured to calculate a clock difference $T_{diff}$ of the first node and the second node according to the sending time T1 of the synchronization request, the receiving time T2 of the clock synchronization request, the sending time T3 of the clock synchronization response and receiving time T4 of the clock synchronization response and determine a clock of the second node according to the clock difference.

Herein, the first node may be a base station without any clock source or a clock control node, and the second node may be a base station with a clock source.

According to an embodiment of the disclosure, a clock synchronization device is also provided, which may be located at a first node and include: a first receiving module, configured to receive an indication message indicating that a second node has no clock source from the second node; a sending module, configured to send a clock synchronization request to the second node, the clock synchronization request containing sending time T1 of the synchronization request; a second receiving module, configured to receive a clock synchronization response from the second node, the clock synchronization response containing the sending time T1 of the synchronization request, receiving time T2 of the clock synchronization request at the second node and sending time T3 of the clock synchronization response; a calculation module, configured to calculate a clock transmission delay between the first node and the second node and/or a clock difference of the first node and the second node according to the sending time T1 of the synchronization request, the receiving time T2 of the clock synchronization request, the sending time T3 of the clock synchronization response and receiving time T4 of the clock synchronization response; and a second sending module, configured to send present clock information of the first node and the transmission delay between the first node and the second node or the clock difference of the first node and the second node to the second node.

Herein, the first node may be a clock control node, and the second node may be a base station without any clock source.

According another embodiment of the disclosure, a storage medium is also provided, in which a computer program may be stored. The computer program may be configured to run to execute the steps in the method embodiments.

According to another embodiment of the disclosure, an electronic device is also provided, which may include a memory and a processor. A computer program may be stored in the memory. The processor may be configured to run the computer program to execute the steps in the method embodiments.

In the embodiments of the disclosure, a corresponding transport resource is pre-configured for a terminal according to a service transmission pattern, so that a service transmission delay between each node may be controlled, and it may be ensured that a service reaches a destination end before taking-effective at the destination end.

BRIEF DESCRIPTION OF THE DRAWINGS

The drawings described here are adopted to provide a further understanding to the disclosure and form a part of the application. Schematic embodiments of the disclosure and descriptions thereof are adopted to explain the disclosure and not intended to form improper limits to the disclosure. In the drawings.

DETAILED DESCRIPTION OF THE EMBODIMENTS

The disclosure will be described below with reference to the drawings and in combination with the embodiments in detail. It is to be noted that the embodiments in the application and characteristics in the embodiments may be combined without conflicts.

It is to be noted that the terms like "first" and "second" in the specification, claims and accompanying drawings of the disclosure are used for differentiating the similar objects, but do not have to describe a specific order or a sequence.

Figure 1:
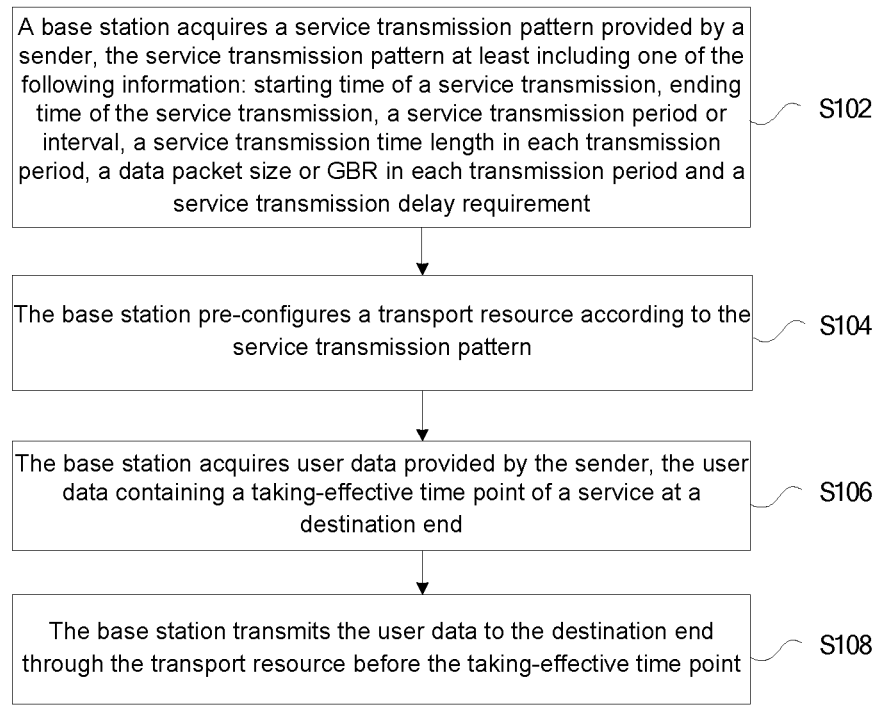
FIG. 1 is a flowchart of a service transmission method according to an embodiment of the disclosure.

A service transmission method is provided in the embodiment. In the embodiment, a service transmission pattern is fixed. FIG. 1 is a flowchart of a method according to an embodiment of the disclosure. As shown in FIG. 1, the flow includes the following steps.

In S102, a base station acquires a service transmission pattern provided by a sender, the service transmission pattern at least including one of the following information: starting time of a service transmission, ending time of the service transmission, a service transmission period or interval, a service transmission time length in each transmission period, a data packet size or GBR in each transmission period and a service transmission delay requirement.

In S104, the base station pre-configures a transport resource according to the service transmission pattern.

In S106, the base station acquires user data provided by the sender, the user data containing a taking-effective time point of a service at a destination end.

In S108, the base station transmits the user data to the destination end through the transport resource before the taking-effective time point.

In the embodiment, an AS or UE may provide the service transmission pattern for the base station, and the destination end is correspondingly the UE or the AS.

In the embodiment, the taking-effective time point of the service at the destination end may be born in the user data.

In the embodiment, multiple service modes may coexist for the same UE, or the multiple service modes of the same UE exist according to a temporal sequence. The base station, after receiving the service transmission pattern, pre-configures a dedicated transport resource for the UE based on the service mode. Pre-configuration of the dedicated transport resource may be implemented by configuring through RRC signaling and/or configuring through DCI.

In the embodiment, a state of the UE and a service transmission delay may be fed back to the AS for the AS to determine service sending time (an instruction is born for each service transmission).

Figure 2:
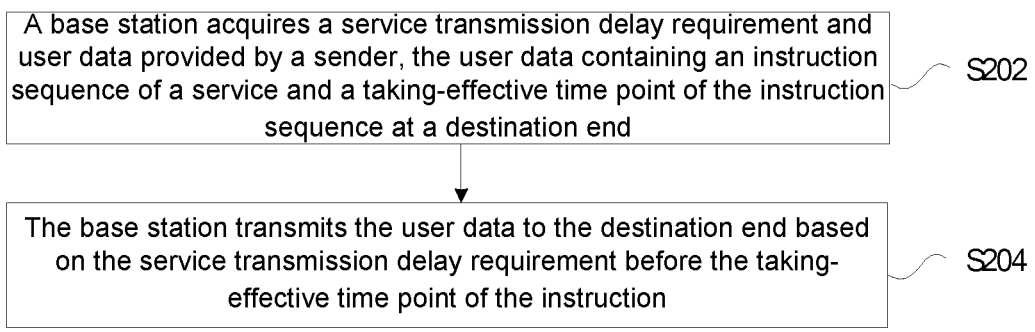
FIG. 2 is another flowchart of a service transmission method according to an embodiment of the disclosure.

Another service transmission method is provided in the embodiment. In the embodiment, a service mode is fixed. FIG. 2 is a flowchart of a method according to an embodiment of the disclosure. As shown in FIG. 2, the flow includes the following steps.

In S202, a base station acquires a service transmission delay requirement and user data provided by a sender, the user data containing an instruction sequence of a service and a taking-effective time point of the instruction sequence at a destination end.

In S204, the base station transmits the user data to the destination end based on the service transmission delay requirement before the taking-effective time point of the instruction.

In the embodiment, an AS or UE may provide the service transmission delay requirement for the base station and provide the instruction sequence of the service for the destination end. A service instruction may include starting time of the instruction sequence of the service and/or ending time of the instruction, a content of the instruction sequence and an interval of the instruction sequence (a plurality of instruction sequences are born for each service transmission). The base station ensures that the service instruction is transmitted to the destination end on time. The destination end correspondingly operates the instruction according to the instruction sequence of the service.

Figure 3:
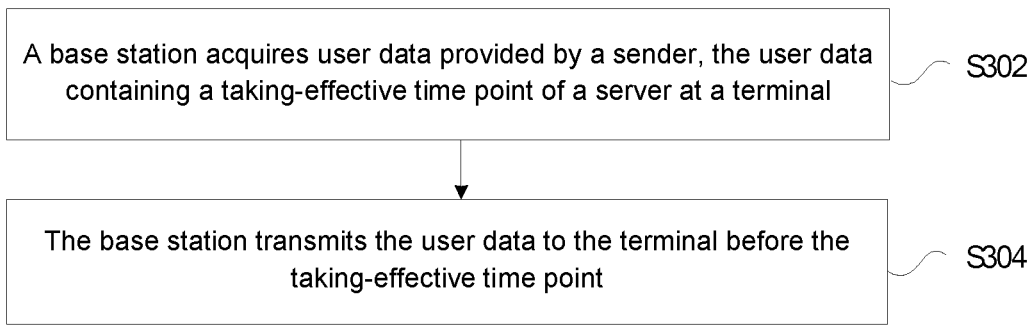
FIG. 3 is another flowchart of a service transmission method according to an embodiment of the disclosure.

Another service transmission method is provided in the embodiment. In the embodiment, a service mode is unfixed. FIG. 3 is a flowchart of a method according to an embodiment of the disclosure. As shown in FIG. 3, the flow includes the following steps.

In S302, a base station acquires user data provided by a sender, the user data containing a taking-effective time point of a server at a terminal.

In S304, the base station transmits the user data to the terminal before the taking-effective time point.

In the embodiment, for a mode unfixed service, an AS or UE indicates a taking-effective time point of the service at a destination end and a transmission delay requirement of the service. The AS or the UE ensures that a sum of transmission starting time of the service at the sender and a service delay is less than or equal to the taking-effective time point of the service at the destination end.

In the embodiment, a service transmission delay may be fed back to the sender, for example, the AS, for the AS to determine service sending time.

Embodiment 1

Figure 4:
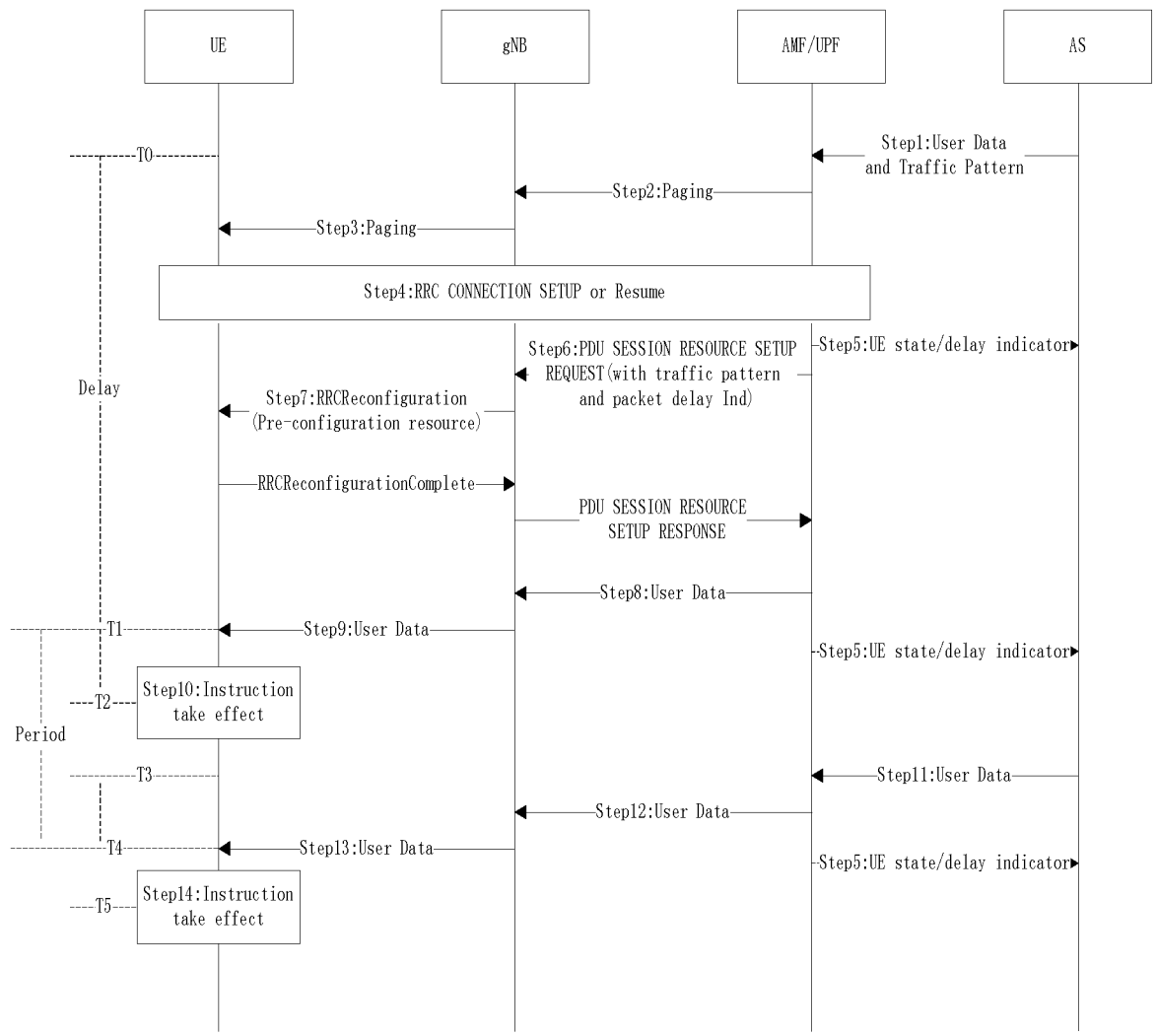
FIG. 4 is a service transmission flowchart of a transmission pattern fixed service according to an embodiment of the disclosure.

In the embodiment, an AS is required to send a service transmission pattern fixed instruction to RRC_Inactive (idle-state) UE. As shown in FIG. 4, the following steps are included.

In Step 1, the AS sends user data and a service transmission pattern to an AMF/UPF at time T0. The service transmission pattern may include starting time of a service transmission, and/or ending time of the service transmission, a service transmission period or interval, a service transmission time length in each transmission period, a data packet size or GBR in each transmission period and a service transmission delay requirement. The user data contains a taking-effective time point of a service at a destination end.

In Step 2, the AMF/UPF sends a paging message to a gNB (a 5th-Generation (5G) base station).

In Step 3, the gNB sends a paging message to the UE.

In Step 4, the UE/gNB establishes or resumes an RRC connection with the AMF/UPF.

In Step 5, the AMF/UPF notifies a state of the UE (the AS is notified when the UE enters an RRC connected state, and when the UE is switched from the connected state to an idle state, a new state of the UE is also required to be notified to the AS) and/or a data transmission delay to the AS for the AS to determine a timing advance for data sending.

In Step 6, the AMF/UPF sends the service transmission pattern of the UE and a service characteristic (for example, the service transmission delay) to the gNB.

In Step 7, the gNB pre-configures a resource required by air interface data transmission for the UE based on the service transmission pattern. Pre-configuration of the resource required by air interface data transmission may be implemented by configuring through RRC signaling and/or configuring through DCI. Configured resource information includes a resource starting position, a resource period or interval, a resource active time length in each resource period and other scheduling information such as a coding scheme required by the service at an air interface.

In Step 8, the AMF/UPF transmits the user data to the gNB.

In Step 9, the gNB transmits the user data to the UE at time T1.

In Step 10, information such as an instruction in the user data is validated on the UE side at time T2 according to a time point indicated by the user data (for example, UE in the field of industry executes a corresponding operation at specified time according to a received control instruction).

In Step 11, the AS sends user data to the AMF/UPF at time T3.

In Step 12, the AMF/UPF transmits the user data to the gNB.

In Step 13, the gNB transmits the user data to the UE at time T4.

In Step 14, information such as an instruction in the user data is validated on the UE side at time T5 according to a time point indicated by the user data (for example, UE in the field of industry executes a corresponding operation at specified time according to a received control instruction).

In the embodiment, starting time of a resource position (transmission starting time of the user data) at the time T1 is configured by the gNB based on the starting time of the service transmission in Step 1, and starting time of a resource position at the time T3 is determined based on the time T1 and the service transmission period/interval in Step 1. The time T2 is more than or equal to the time T1, and the time T4 is more than or equal to the time T3. That is, it is ensured that the service reaches the destination end before the service is validated. Assistance of a source of the service during sending is required. For example, a time length (T2-T0) from sending of an instruction by UE in the idle state to taking-effective of the instruction is usually greater than a time length (T5-T3) from sending of an instruction of UE in the connected state to taking-effective of the instruction. This is because T2-T0 includes a time length of establishment or resume of the RRC connection and this time length is required to be considered when the AS sends data. This is why the AMF/UPF sends the state of the UE to the AS in Step 5.

Herein, in Step 1, multiple service modes may coexist for the same UE, or the multiple service modes of the same UE exist according to a temporal sequence. Correspondingly, in Step 7, multiple periodic resources are configured for the same UE, or multiple pieces of activation time are configured in a period. If multiple periodic resources are configured for the same UE, the resources may be configured through DCI, and a resource interval or period and resource numbers are required to be configured through RRC signaling. Resource scheduling (activation or deactivation) is performed on each numbered resource through the DCI.

Figure 5:
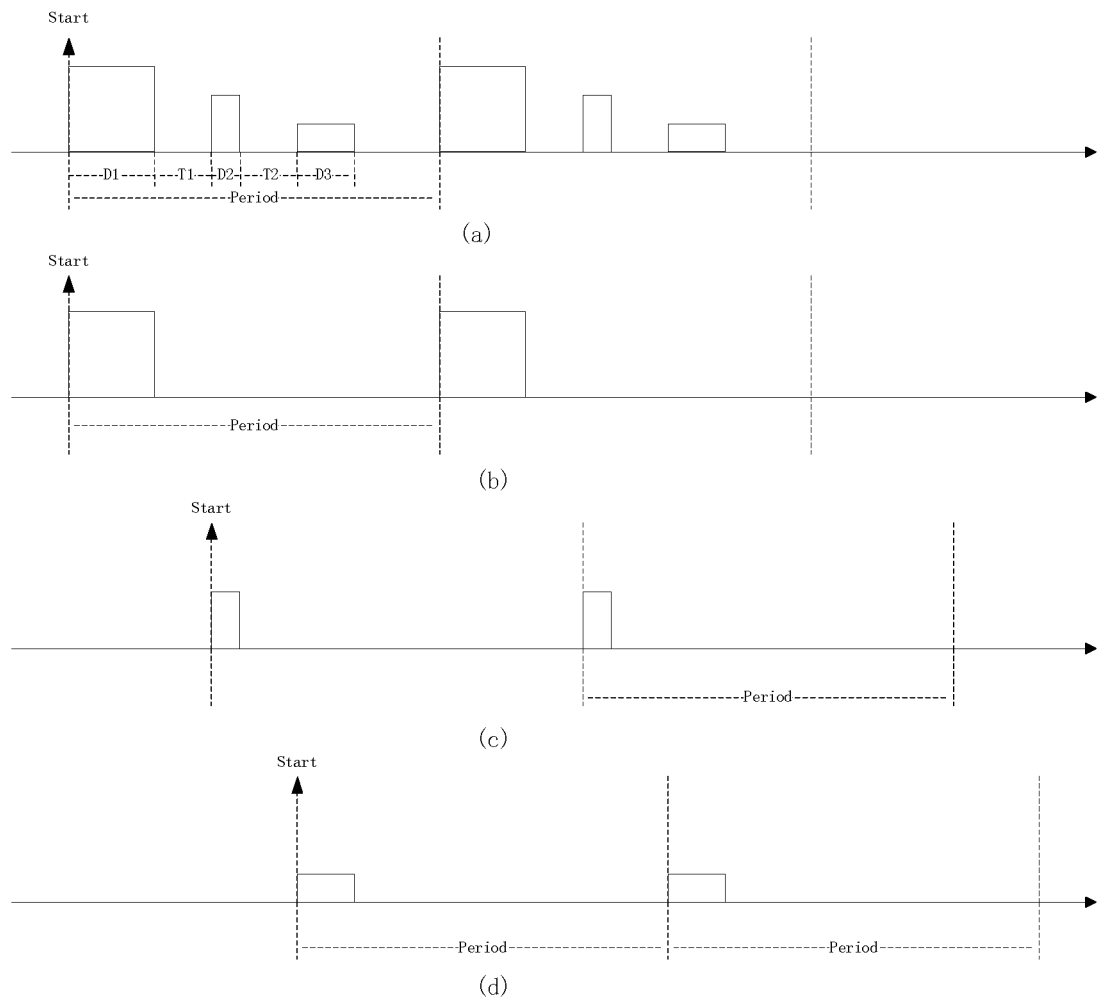
FIG. 5 is a schematic diagram of a service transmission pattern of a transmission pattern fixed service according to an embodiment of the disclosure.

For a transmission pattern fixed service transmission, an indication manner for a service transmission pattern thereof is described below. As shown in FIG. 5, a manner of indicating multiple service modes of the same UE according to a temporal sequence is shown in FIG. 5(a). There are three resource block active time buckets (D1/D2/D3) in a period, and intervals of the resource block active time buckets are T1/T2 respectively. Correspondingly, in Step 7, a semi-static resource is configured for the same UE. Each semi-static resource has three discrete resource blocks, specifically represented as follows:

{
  resource starting time;
  resource interval or period
  time length of resource block 1
  scheduling information of resource block 1 time length of resource block 2
scheduling information of resource block 2 (NULL)
time length of resource block 3
scheduling information of resource block 3
time length of resource block 4
scheduling information of resource block 4 (NULL)
time length of resource block 5
scheduling information of resource block 5
}.

FIG. (a) is split into FIG. 5(b) to (d). Three resource blocks in a period are split into three service modes. Correspondingly, in Step 7, multiple semi-static resources are configured for the same UE, specifically represented as follows:

{
starting time of resource block 1
period of resource block 1
scheduling information of resource block 1
starting time of resource block 2
period of resource block 2
scheduling information of resource block 2
starting time of resource block 3
period of resource block 3
scheduling information of resource block 3
}.

Embodiment 2

Figure 6:
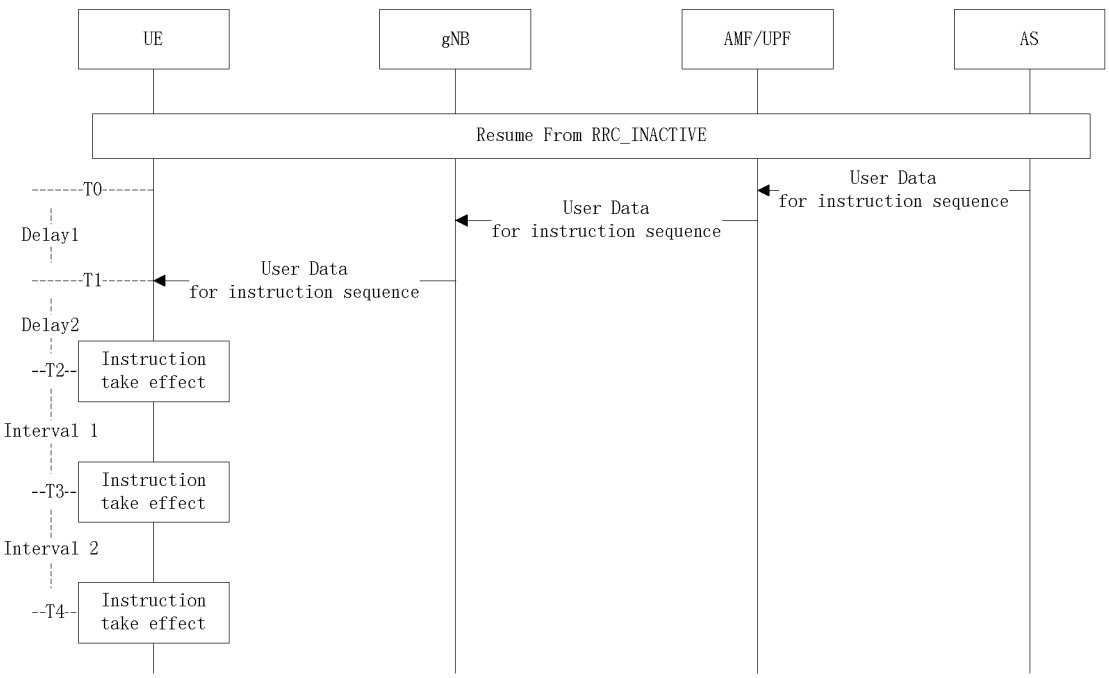
FIG. 6 is a service transmission flowchart of a service mode fixed service according to an embodiment of the disclosure.

FIG. 6 is an implementation example of service transmission of a service mode fixed service. In the embodiment, an AS is required to send a service mode fixed instruction set to UE in a connected state.

In Step 1, the AS sends user data information containing a plurality of instruction sequences to an AMF/UPF at time T0.

In Step 2, the AMF/UPF transmits the user data information including the instruction sequences to a gNB.

In Step 3, the gNB transmits the user data information including the instruction sequences to the UE at time T1.

In Step 4, a first instruction in the user data information is validated at time T2 according to a time point indicated by the instruction; a second instruction in the user data information is validated at time T3 according to a time point indicated by the instruction; and a third instruction in the user data information is validated at time T4 according to a time point indicated by the instruction.

In the embodiment, user data sending time of the AS is required to ensure that the time (T1) when user data reaches the UE is earlier than the taking-effective time point T2/T3/T4. For the sending time, it is necessary to consider a transmission delay Delay1 of the user data and ensure that Delay2 is more than or equal to 0. Interval 1 and Interval 2 are intervals of instructions in the user data. The interval may be indicated explicitly, for example, indicated by relative time between the instructions, and may also be indicated implicitly, for example, absolute time of each instruction is indicated.

Figure 7:
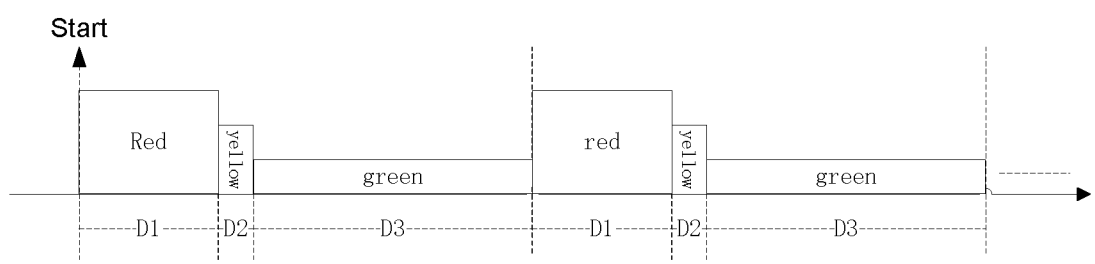
FIG. 7 is a schematic diagram of a service mode instruction set according to an embodiment of the disclosure.

The service mode instruction set is described below through an embodiment. FIG. 7 is an example of the service mode instruction set. In the embodiment, transmission light control is taken as an example. As shown in FIG. 7, a network side sends a transmission light control instruction to UE (transmission light terminal module). At starting time of the instruction, the red light is turned on for a time length D1, then the yellow light is turned on for a time length D2, the green light is turned on for a time length D3, and then the red light is turned on for the time length D1. The sender is required to ensure that the UE receives the instruction at the starting time of the instruction. The UE, after receiving the instruction, executes the instruction according to a time sequence of the instruction.

Embodiment 3

Figure 8:
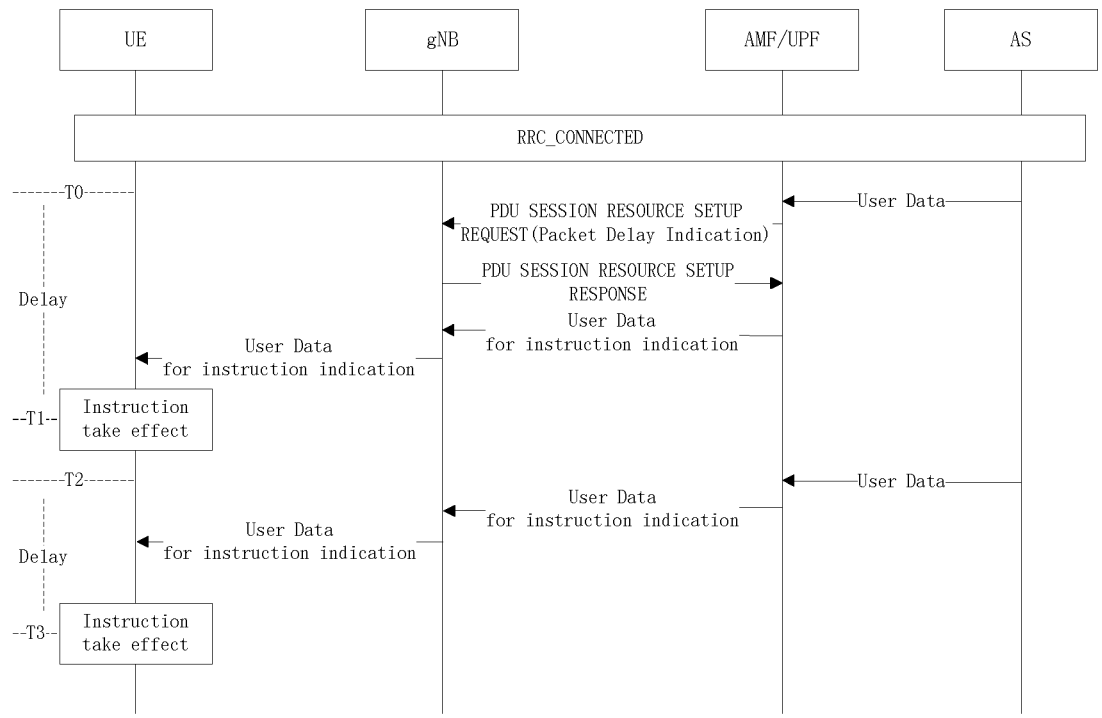
FIG. 8 is a service transmission flowchart of a transmission pattern unfixed service according to an embodiment of the disclosure.

FIG. 8 is an implementation example of service transmission of a transmission pattern unfixed service. In the embodiment, an AS sends a service transmission pattern unfixed instruction to UE in a connected mode. As shown in FIG. 8, the following steps are included.

In Step 1, the AS sends user data to an AMF/UPF at time T0.

In Step 2, the AMF/UPF sends a data packet delay requirement to a gNB. The requirement may be born in a Protocol Data Unit (PDU) SESSION RESOURCE SETUP REQUEST or a similar message between a base station and a core network.

In Step 3, the gNB sends a response message of the data packet delay requirement to the AMF/UPF. The message may be a PDU SESSION RESOURCE SETUP RESPONSE or a similar message between the base station and the core network.

In Step 4, the AMF/UPF sends user data to the gNB.

In Step 5, the gNB sends the user data to the UE.

In Step 6, the UE executes a response operation based on an instruction contained in the user data at time T1.

In Step 7, the AS sends user data to the AMF/UPF at time T2.

In Step 8, the AMF/UPF sends the user data to the gNB.

In Step 9, the gNB sends the user data to the UE.

In Step 10, the UE executes a response operation based on an instruction contained in the user data at time T1.

In the embodiment, after a data transmission is completed, the AMF/UPF may send a data transmission delay to the AS for the AS to determine a data sending advance for next data transmission. The data transmission delay may be acquired by the AMF/UPF based on a data transmission confirmation message or acquired based on statistical information about data receiving time fed back by the UE/gNB.

Embodiment 4

Figure 9:
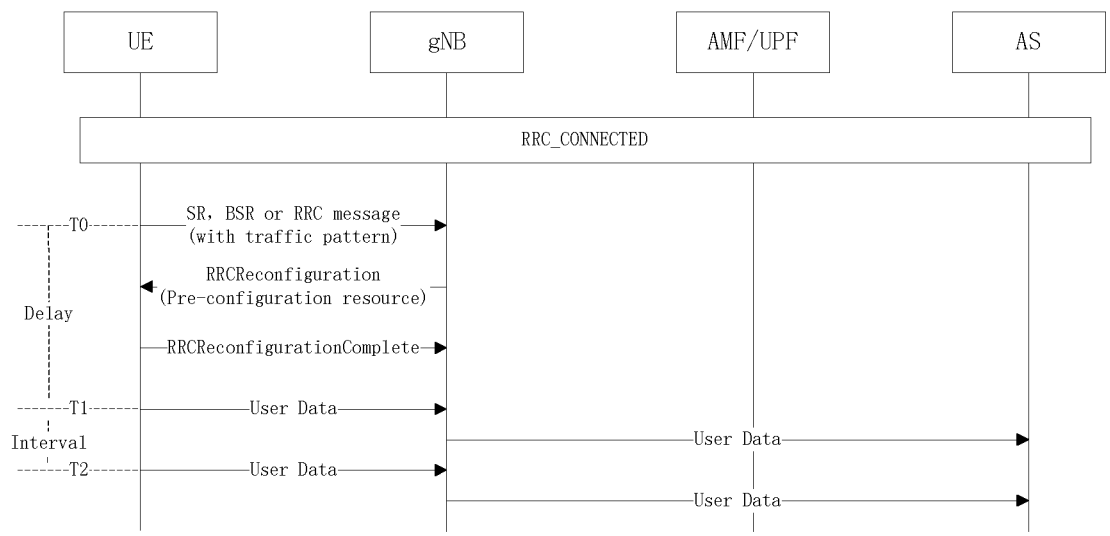
FIG. 9 is a service transmission flowchart of a transmission pattern fixed uplink service according to an embodiment of the disclosure.

FIG. 9 is an implementation example of service transmission of a transmission pattern fixed uplink service. The embodiment is similar to embodiment 1, and the difference is that service transmission of an uplink service is involved in the example. Therefore, a service transmission pattern is provided by UE, and user data is also sent by the UE. As shown in FIG. 9, the following steps are included.

In Step 1, the UE sends the service transmission pattern to a gNB at time T0. The service transmission pattern may include starting time of the service transmission, and/or ending time of the service transmission, a service transmission period or interval, a service transmission time length in each transmission period, a data packet size or GBR in each transmission period and a service transmission delay requirement.

In Step 2, the gNB pre-configures a resource required by data transmission for the UE based on the service transmission pattern. Pre-configuration of the resource required by data transmission may be implemented by configuring through RRC signaling. Configured resource information may include information such as a resource starting position, a resource period or interval and a resource active time length in each resource period.

In Step 3, the UE feeds back completion of resource pre-configuration to the gNB.

In Step 4, the UE transmits user data to the gNB at time T1, and the gNB transmits the user data to an AS through an AMF/UPF according to a delay requirement to ensure that the user data reaches the destination end before a taking-effective time point.

In Step 5, the UE transmits next user data to the gNB at time T2 after a time interval Interval1.

In Step 6, the gNB transmits the present user data to the AS through the AMF/UPF according to the delay requirement.

In the embodiment of the disclosure, for ensuring that the user data reaches the destination end before the taking-effective time point, multiple clock parameters are involved, so that clock accuracy of UE is quite important in a highly delay-sensitive network. Under a normal condition, UE may read a clock of a gNB to ensure clock synchronization between different UE under the same gNB. However, considering that different UE may be under different gNBs, for ensuring clock synchronization between UE under different gNBs, it is necessary to ensure clock synchronization between different gNBs. In a conventional strategy, synchronization between gNBs is implemented by aligning clocks of the gNBs and clocks of Global Positioning System (GPSs). However, for a scenario that an indoor base station has no GPS, there is no related synchronization strategy at present.

Therefore, the disclosure also provides a method for clock synchronization between base stations. The method may be combined to the abovementioned embodiments to acquire accurate clock parameters to ensure that a service is transmitted on time in a delay-sensitive network.

FIG. 9 is an implementation example of distributed clock synchronization between gNBs. In the embodiment, a strategy for distributed clock alignment between gNBs is provided. A gNB1 has a clock source and thus may acquire clock information accurate to more than 1 microsecond. A gNB2 has no clock source and thus may not acquire clock information accurate to more than 1 microsecond. Therefore, a clock of the gNB2 without any clock source is aligned to a clock of the gNB1 with the clock source. As shown in FIG. 9, the following steps are specifically included.

In Step 1, the gNB1 with the clock source sets its own clock based on the clock source, and the gNB2 without any clock source sets its default clock source.

In Step 2, the gNB1 with the clock source indicates the gNB2 without any clock source that it has the clock source.

In Step 3, the gNB2 without any clock synchronization source sends a clock synchronization request to the gNB1, sending time T1 of information being contained.

In Step 4, the gNB1 sends a clock synchronization response to the gNB2. The clock synchronization response may contain T1, receiving time T2 of the clock synchronization request information at the gNB1 and sending time T3 of the clock synchronization response message at the gNB1.

In Step 5, the gNB2 calculates a time difference of the gNB1 and the gNB2 based on T1, T2, T3 and T4 (T4 is receiving time of the clock synchronization response message at the gNB2), thereby determining the clock of the gNB2.

A specific calculation process of the time difference between the gNB1 and the gNB2 is as follows:

$$\begin{cases} T1 + \text{Delay} + T_{diff} = T2 \\ T3 + \text{Delay} - T_{diff} = T4 \end{cases} \Rightarrow T_{diff} = \frac{(T2-T4)-(T1-T3)}{2}$$

$$\Rightarrow GPSclock = T1 + T_{diff} = \frac{(T2+T1)-(T3+T4)}{2}$$

where Delay is a transmission delay of an Xn interface, and $T_{diff}$ is the time difference of the gNB2 and the gNB1.

Figure 11:
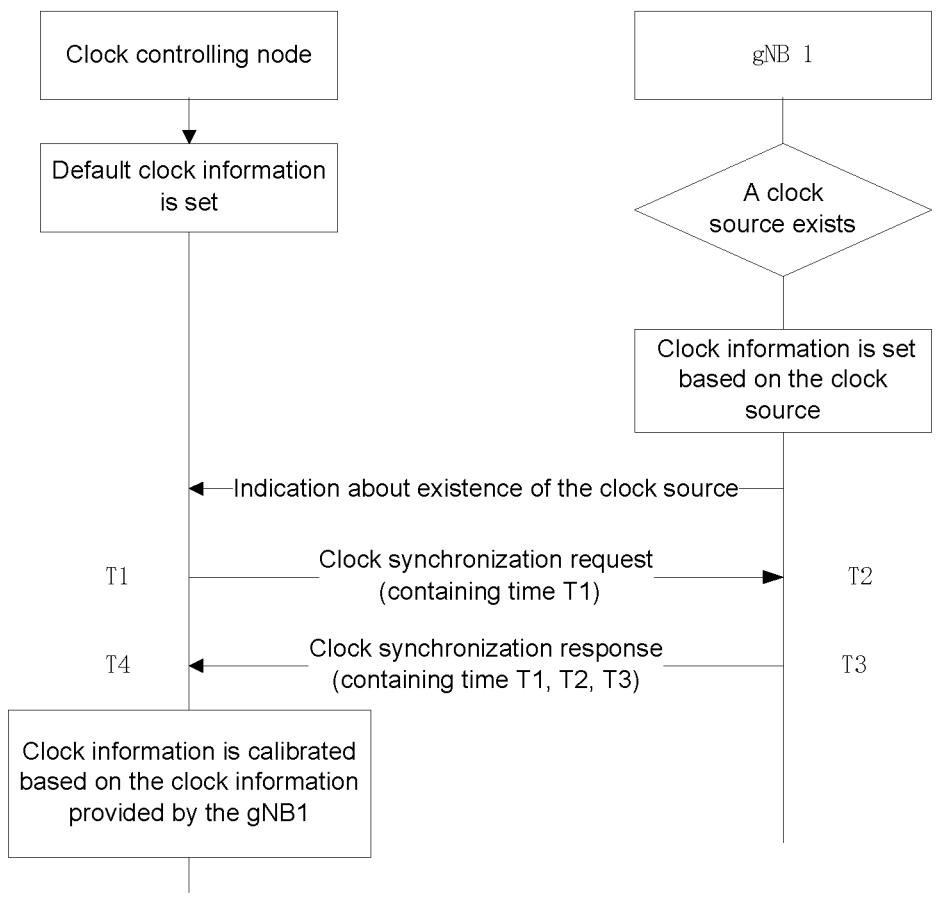
FIG. 11 is a flowchart of clock synchronization between a base station with a clock source and a clock control node according to an embodiment of the disclosure.

The disclosure also provides an embodiment of centralized clock synchronization between base stations. In the embodiment, clock synchronization between a base station with a clock synchronization source and a clock control node is involved. As shown in FIG. 11, the following steps are included.

In Step 1, a gNB1 with a clock synchronization source indicates the clock control node that it has the clock source. The clock control node may be a Centralized Unit (CU), an AMF or a higher-layer network element.

In Step 2, the clock control node sends a clock synchronization request (containing time information T1) to the gNB1.

In Step 3, the gNB1 feeds back a clock synchronization response (containing time information T1 and/or T2/T3) to the clock control node.

Figure 10:
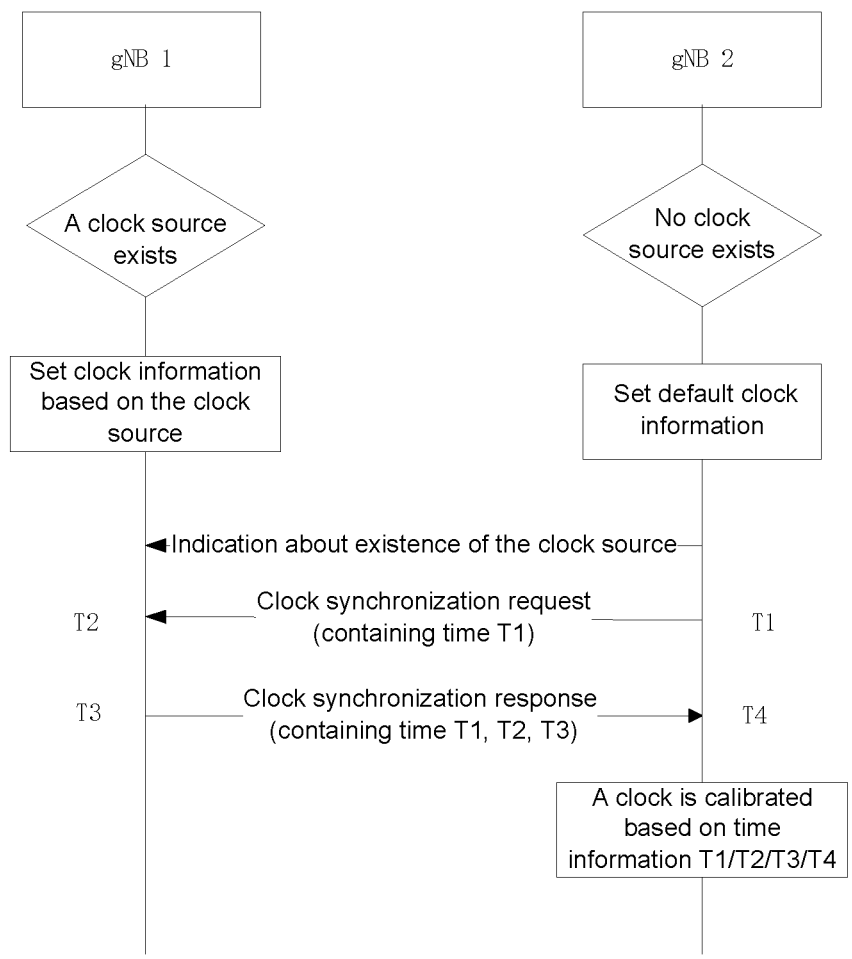
FIG. 10 is a flowchart of clock synchronization between a base station with a clock source and a base station without any clock source according to an embodiment of the disclosure.

In Step 4, the clock control node calculates a time difference of the clock control node and the gNB1 based on T1/T2/T3/T4, thereby determining a clock of the clock control node and calibrating the clock. A calculation process is similar to the embodiment shown in FIG. 10.

Figure 12:
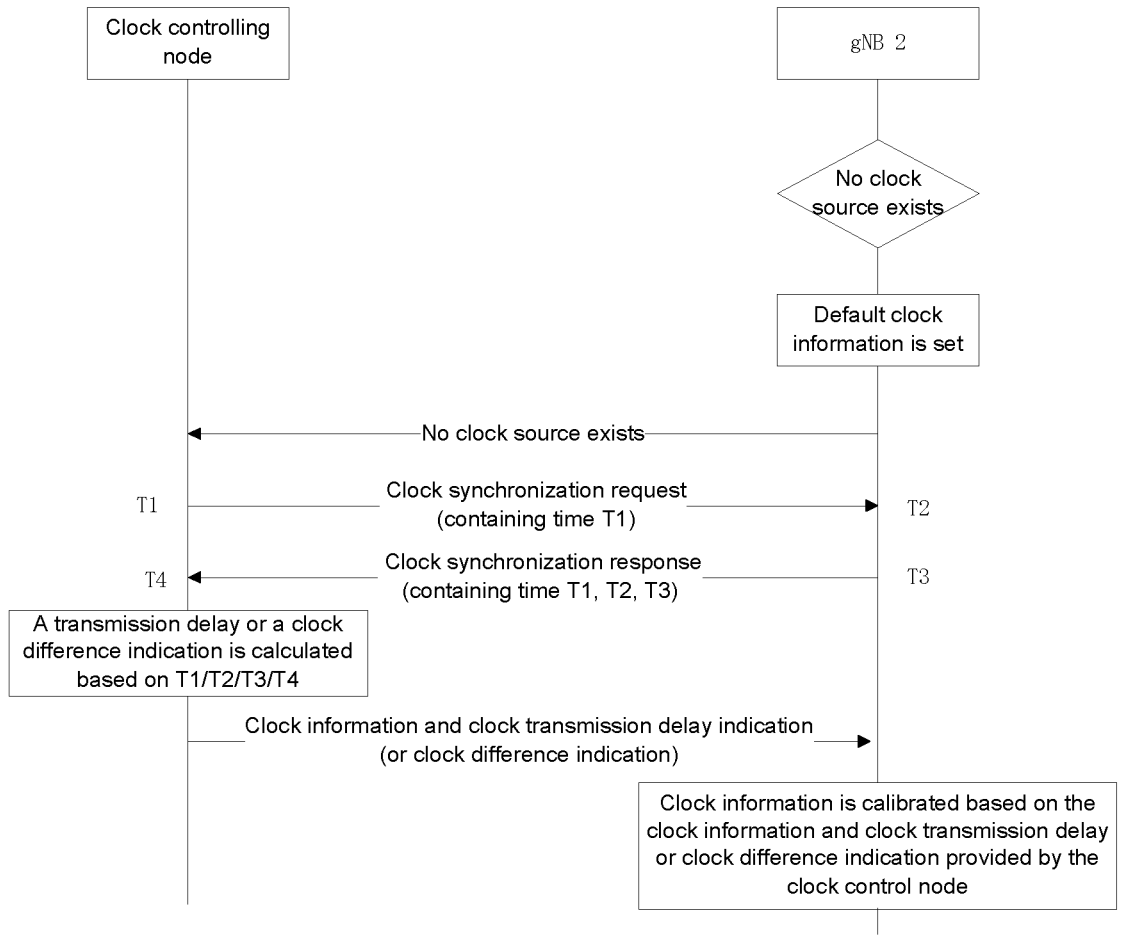
FIG. 12 is a flowchart of clock synchronization between a clock control node and a base station without any clock source according to an embodiment of the disclosure.

The disclosure also provides clock synchronization between a base station without any clock synchronization source and a clock control node. As shown in FIG. 12, the following steps are included.

In Step 1, a gNB2 without any clock synchronization source indicates the clock control node that it has no clock source. The clock control node may be a CU, an AMF or a higher-layer network element.

In Step 2, the clock control node sends a clock synchronization request (containing time information T1) to the gNB2.

In Step 3, the gNB2 feeds back a clock synchronization response (containing time information T1 and/or T2/T3) to the clock control node.

In Step 4, the clock control node calculates a time difference of the clock control node and the gNB2 or a transmission delay between the clock control node and the gNB2 based on T1/T2/T3/T4. A calculation process is similar to the embodiment shown in FIG. 10.

In Step 5, the clock control node sends present clock information and the clock transmission delay or clock difference information of the clock control node and the gNB2 to the gNB2.

In Step 6, the gNB2 calibrates its own clock based on the clock information and clock transmission delay or clock difference information of the clock control node and the gNB2 to the gNB2, provided by the clock control node.

Through the above descriptions about the implementation modes, those skilled in the art may clearly know that the methods according to the abovementioned embodiments may be implemented in a manner of combining software and a necessary universal hardware platform.

The embodiment also provides a service transmission device, which is configured to implement the abovementioned embodiments and preferred implementation modes. What has been described will not be elaborated. For example, term "module" used below may be a combination of software and/or hardware capable of realizing a preset function. Although the devices described in the following embodiment are preferably implemented with software, implementation with hardware or a combination of the software and the hardware is also possible and conceivable.

Figure 13:
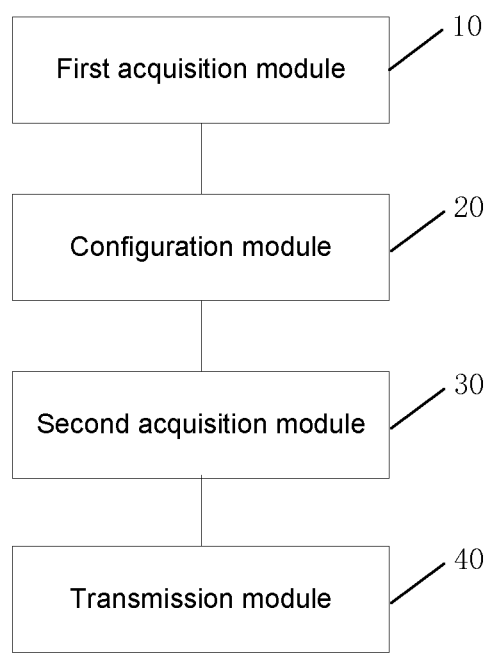
FIG. 13 is a structure block diagram of a service transmission device according to an embodiment of the disclosure.

FIG. 13 is a structure block diagram of a service transmission device according to an embodiment of the disclosure. As shown in FIG. 13, the device includes a first acquisition module 10, a configuration module 20, a second acquisition module 30 and a transmission module 40.

The first acquisition module 10 is configured to acquire a service transmission pattern provided by a sender, the service transmission pattern at least including one of the following information: starting time of a service transmission, ending time of the service transmission, a service transmission period or interval, a service transmission time length in each transmission period, a data packet size or GBR in each transmission period and a service transmission delay requirement.

The configuration module 20 is configured to pre-configure a transport resource according to the service transmission pattern.

The second acquisition module 30 is configured to acquire user data provided by the sender, the user data containing a taking-effective time point of a service at a destination end.

The transmission module 40 is configured to transmit the user data to the destination end through the transport resource before the taking-effective time point.

It is to be noted that each module may be implemented through software or hardware and, under the latter condition, may be implemented in, but not limited to, the following manner: the modules are all positioned in the same processor, or the modules are positioned in different processors in any combination form respectively.

The embodiment of the disclosure also provides a storage medium, in which a computer program is stored, the computer program being configured to run to execute the steps in any abovementioned method embodiment.

The embodiment of the disclosure also provides an electronic device, which includes a memory and a processor. A computer program is stored in the memory. The processor is configured to run the computer program to execute the steps in any abovementioned method embodiment.

It is apparent that those skilled in the art should know that each module or each step of the disclosure may be implemented through a universal computing device. They may be concentrated in a single computing device or distributed in a network formed by multiple computing devices. Optionally, they may be implemented by program codes executable for the computing devices and thus may be stored in a storage device for execution with the computing devices. Moreover, in some cases, the shown or described steps may be executed in sequences different from those described here, or may form various integrated circuit modules respectively, or multiple modules or steps therein may form a single integrated circuit module for implementation. Therefore, the disclosure is not limited to any specific hardware and software combination.

The above is only the preferred embodiment of the disclosure and not intended to limit the disclosure. For those skilled in the art, the disclosure may have various modifications and variations. Any modifications, equivalent What claimed is:

1. A service transmission method, comprising:
   acquiring, by a base station, a service transmission pattern provided by a sender, the service transmission pattern at least comprising one of the following information: starting time of a service transmission, ending time of the service transmission, a service transmission period or interval, a service transmission time length in each transmission period, a data packet size or Guaranteed Bit Rate (GBR) in each transmission period, and a service transmission delay requirement;
   pre-configuring, by the base station, a transport resource according to the service transmission pattern;
   acquiring, by the base station, user data provided by the sender, the user data containing a taking-effective time point of a service at a destination end; and
   transmitting, by the base station, the user data to the destination end through the transport resource before the taking-effective time point.

2. The method according to claim 1, wherein the transport resource at least comprises one of the following: a resource starting position, a resource period or interval, and a resource active time length in each resource period.

3. The method according to claim 1, wherein there are multiple service transmission patterns, the multiple service transmission patterns coexist in the service transmission, or the multiple service transmission patterns exist in the service transmission according to a temporal sequence.

4. The method according to claim 3, wherein pre-configuring, by the base station, the transport resource according to the transmission pattern comprises:
   pre-configuring, by the base station, a periodic transport resource for each service transmission pattern, or configuring, by the base station, different activation time for each service transmission pattern in a periodic transport resource.

5. The method according to claim 1, wherein the transport resource is configured through Radio Resource Control (RRC) signaling and/or configured through Downlink Control Information (DCI).

6. The method according to claim 1, further comprising:
   feeding back a state of the destination end and/or a user data transmission delay to the sender for the sender to determine a time advance for next user data sending.

7. The method according to claim 1, wherein the sender is an Application Server (AS), and the destination is User Equipment (UE).

8. The method according to claim 7, wherein acquiring, by the base station, the service transmission pattern provided by the sender comprises:
   receiving, by an Access and Mobility Management Function (AMF)/User Plane Function (UPF), the user data and/or service transmission pattern sent by the AS;
   sending, by the AMF/UPF, a paging message to the base station, sending, by the base station, a paging message to the UE, and establishing or resuming RRC connections between the UE, the base station and the AMF/UPF; and
   receiving, by the base station, the service transmission pattern from the AMF/UPF.

9. The method according to claim 1, wherein the sender is first UE, and the destination is the AS or second UE.

10. The method according to claim 1, wherein a type of the service is an Industrial Internet of Things (IIoT) service.

11. An electronic device, comprising a memory and a processor, wherein a computer program is stored in the memory; and the processor is configured to run the computer program to execute the methods as claimed in claim 1.

12. A service transmission method, comprising:
   acquiring, by a base station, a service transmission delay requirement and user data provided by a sender, the user data containing an instruction sequence of a service and a taking-effective time point of the instruction sequence at a destination end; and
   transmitting, by the base station, the user data to the destination end based on the service transmission delay requirement before the taking-effective time point of the instruction.

13. The method according to claim 12, wherein the user data contains multiple instruction sequences, and each instruction sequence has corresponding a taking-effective time point.

14. The method according to claim 12, wherein the instruction sequence comprises at least one of the following information: starting time of the instruction sequence, ending time of an instruction, a content of the instruction sequence and an interval of the instruction sequence.

15. The method according to claim 12, further comprising:
   feeding back a state of the destination end and/or a user data transmission delay to the sender for the sender to determine a time advance for next user data sending.

16. The method according to claim 12, wherein the sender is an Application Server (AS), and the destination end is User Equipment (UE); or, the sender is first UE, and the destination end is the AS or second UE.

17. A clock synchronization method, comprising:
   receiving, by a first node, an indication message indicating that a second node has a clock source from the second node;
   sending, by the first node, a clock synchronization request to the second node, the clock synchronization request containing sending time T1 of the synchronization request;
   receiving, by the first node, a clock synchronization response from the second node, the clock synchronization response containing the sending time T1 of the synchronization request, receiving time T2 of the clock synchronization request at the second node and sending time T3 of the clock synchronization response; and
   by the first node, calculating a clock difference $T_{diff}$ of the first node and the second node according to the sending time T1 of the synchronization request, the receiving time T2 of the clock synchronization request, the sending time T3 of the clock synchronization response and receiving time T4 of the clock synchronization response and determining a clock of the second node according to the clock difference.

18. The method according to claim 17, wherein the first node calculates the clock difference of the first node and the second node according to the following formula:

$$\begin{cases} T1 + \text{Delay} + T_{diff} = T2 \\ T3 + \text{Delay} - T_{diff} = T4 \end{cases},$$

where Delay is a transmission delay between the first node and the second node, and $T_{diff}$ is the clock difference of the first node and the second node.

19. The method according to claim 17, before receiving, by the first node, the indication message indicating existence of the clock source from the second node, further comprising:
   setting, by the first node, default clock information of the first node, and setting, by the second node, clock information of the second node according to the clock source.

20. The method according to claim 17, wherein the first node is a base station without any clock source or a clock control node, and the second node is a base station with a clock source.

* * * * *